United States Patent [19]
Asato

[11] Patent Number: 6,145,074
[45] Date of Patent: Nov. 7, 2000

[54] SELECTING REGISTER OR PREVIOUS INSTRUCTION RESULT BYPASS AS SOURCE OPERAND PATH BASED ON BYPASS SPECIFIER FIELD IN SUCCEEDING INSTRUCTION

[75] Inventor: Akira Asato, Kawasaki, Japan

[73] Assignee: Fujitsu Limited, Kawasaki, Japan

[21] Appl. No.: 09/044,846

[22] Filed: Mar. 20, 1998

[30] Foreign Application Priority Data

Aug. 19, 1997 [JP] Japan ................................. 9-222448

[51] Int. Cl.⁷ ..................................................... G06F 9/38
[52] U.S. Cl. .......................................... 712/218; 712/219
[58] Field of Search ..................................... 712/218, 219

[56] References Cited

U.S. PATENT DOCUMENTS 5,805,852  9/1998  Nakanishi ............................... 712/218
5,842,036  11/1998  Hinton et al. ............................. 712/23
5,872,986  2/1999  Heeb ........................................ 712/1
5,958,043  9/1999  Motomura ............................... 712/216

*Primary Examiner*—Kenneth S. Kim
*Attorney, Agent, or Firm*—Staas & Halsey LLP

[57] ABSTRACT

A data processing device having a pipeline bypass function passes an operation result of a preceding instruction to a succeeding instruction as a source operand before writing the operation result to a register. A source operand bypass specification field and a source operand register field in the instruction code are provided to control passing of the operation result. A source operand selector responds to the source operand bypass specification field by selecting data either from the register or the bypasses as a pipeline input data.

40 Claims, 11 Drawing Sheets

|            | t1 | t2 | t3 | t4 | t5 | t6 | t7 |
|------------|----|----|----|----|----|----|----|
| Instruction 1 | D | E1 | E2 | W  |    |    |    |
| Instruction 2 |   | D  | E1 | E2 | W  |    |    |
| Instruction 3 |   |    | D  | E1 | E2 | W  |    |
| Instruction 4 |   |    |    | D  | E1 | E2 | W  |

FIG. 9a

|            | t1 | t2 | t3 | t4 | t5 | t6 | t7 | t8 | t9 | t10 |
|------------|----|----|----|----|----|----|----|----|----|-----|
| Instruction 1 | D | E1 | E2 | W  |    |    |    |    |    |     |
| Instruction 2 |   |    | D  | D  | D  | E1 | E2 | W  |    |     |
| Instruction 3 |   |    |    |    |    | D  | E1 | E2 | W  |     |
| Instruction 4 |   |    |    |    |    |    |    | D  | E1 | E2  | W |

Read from register

FIG. 9b

|            | t1 | t2 | t3 | t4 | t5 | t6 | t7 | t8 |
|------------|----|----|----|----|----|----|----|----|
| Instruction 1 | D | E1 | E2 | W  |    |    |    |    |
| Instruction 2 |   | D  | E1 | E2 | W  |    |    |    |
| Instruction 3 |   |    | D  | E1 | E2 | W  |    |    |
| Instruction 4 |   |    |    | D  | E1 | E2 | W  |    |

FIG. 9c

|  | t1 | t2 | t3 | t4 | t5 |
|---|---|---|---|---|---|
| Instruction 1 | D | E1 | E2 | W |  |
| Instruction 2 |  | D | E1 | E2 | W |

FIG. 16a

|  | t1 | t2 | t3 | t4 | t5 | t6 | t7 | t8 |
|---|---|---|---|---|---|---|---|---|
| Instruction 1 | D | E1 | E2 | W |  |  |  |  |
| Instruction 2 |  | D | D | D | D | E1 | E2 | W |

FIG. 16b

|  | t1 | t2 | t3 | t4 | t5 | t6 | t7 |
|---|---|---|---|---|---|---|---|
| Instruction 1 | D | E1 | E2 | W |  |  |  |
| Instruction 2 |  | D | D | D | E1 | E2 | W |

FIG. 16c

|  | t1 | t2 | t3 | t4 | t5 | t6 |
|---|---|---|---|---|---|---|
| Instruction 1 | D | E1 | E2 | W |  |  |
| Instruction 2 |  | D | D | E1 | E2 | W |

FIG. 16d

|  | t1 | t2 | t3 | t4 | t5 |
|---|---|---|---|---|---|
| Instruction 1 | D | E1 | E2 | W |  |
| Instruction 2 |  | D | E1 | E2 | W |

FIG. 16e

SELECTING REGISTER OR PREVIOUS INSTRUCTION RESULT BYPASS AS SOURCE OPERAND PATH BASED ON BYPASS SPECIFIER FIELD IN SUCCEEDING INSTRUCTION

CROSS-REFERENCE TO RELATED APPLICATIONS

This application is based upon and claims priority of Japanese Patent Application No. 09-222448 filed Aug. 19, 1997, the contents being incorporated herein by reference.

BACKGROUND OF THE INVENTION

The present invention relates to a data processing device with a pipeline mechanism, featuring a pipeline bypass circuit for reducing a number of operation cycles.

Pipeline computers are already in use that execute several instructions in parallel. In pipeline processing, the operation process is executed by a single instruction which is then divided into several operation stages chronologically independent of each other. Each operation stage of an instruction is executed by a corresponding operation unit. In each instruction cycle, several operation units execute mutually different operation stages in parallel.

FIG. 16(a) illustrates a pipeline computer that executes an instruction by decoding the instruction. The pipeline computer reads its operand register in stage D, executes the first operation in stage E1, executes the second operation in stage E2, and writes the operation result into a register in stage W. The pipeline computer executes a preceding instruction 1 and a succeeding instruction 2 (with no mutual dependence between the instructions) usually in the sequence illustrated in FIG. 16(a).

When reading data from the source operand register of an instruction, a general pipeline computer should hold read processing until a preceding instruction that uses the same register as the target operand completes writing into the register.

For example, this type of computer executes two instructions continuously as follows:

Instruction 1: r1=r2+r3
Instruction 2: r4=r1+r5

Instruction 1 adds the contents of register r3 to register r2 and writes the result into register r1, while instruction 2 adds the contents of register r5 to register r1 and writes the result into register r4.

A computer with a simple pipeline mechanism executes the above two instructions by the sequence shown in FIG. 16(b). The succeeding instruction 2 can start the first operation at stage D only after the last operation at stage W of the preceding instruction 1 is completed.

If write data is confirmed by a cycle before write processing is completed, as in the above instruction string in FIG. 16(b), a source operand read path from the pipeline register is often set before completion of register write processing to minimize a number of waiting cycles. This path is called a bypass. Setting a bypass changes the instruction execution sequence as shown in, for example, FIG. 16(c). Compared to the sequence shown in FIG. 16(b) where no bypass is used, the processing speed is enhanced by one cycle.

FIG. 17 (prior art) illustrates a sample configuration of a conventional pipeline computer 228 using a bypass circuit. FIG. 17 (prior art) particularly illustrates a register file (100), pipeline registers (101, 102) for storing source operands, an operation unit (103) for the first operation, a pipeline register (104) for holding output from the operation unit (103), an operation unit (105) for the second operation, a register (106) for holding output from the operation unit (105), a bypass control circuit (107) for determining the possibility of pipeline bypass control under hardware control by holding the contents of several consecutive instructions, selectors (108, 109), register read lines (110, 111), a register write line (112), bypass lines (113–115), and select signal lines (116, 117).

The above two instructions are executed as follows:

Instruction 1: r1=r2+r3
Instruction 2: r4=r1+r5

In this prior art example, the write data is confirmed by the time that output from the operation unit (105) is set in the register (106) before the execution result of instruction 1 is written into the register file (100). Therefore, input to the selectors (108, 109) through the bypass line (115) hastens the source operand read cycle of instruction 2 by one cycle, as shown in FIG. 16(c), compared to processing without a bypass operation.

As to a floating-point operation, the operation unit (103) executes digit alignment between two operands and a post-alignment operation. The operation unit (105) executes post-operation normalization. The final result cannot be obtained until the execution of the operation unit (105) is completed. As to an integer operation, however, the final result can be obtained from the operation only at the operation unit (103). Inputting the output from the pipeline register (104) to the selectors (108, 109) through the bypass line (114) hastens the source operand read cycle of instruction 2 by two cycles as shown in FIG. 16(d), compared to processing without a bypass operation.

If an operation result is confirmed in the middle of processing at the operation unit (103) and a signal line (113) can output a corresponding signal read from operation unit (103), inputting the confirmed data to the selectors (108, 109) through the bypass line (113) executes the source operand read processing for instruction 2 without delay, as shown in FIG. 16(e).

For correct pipeline control under the conventional hardware control, data dependence between the instructions was analyzed and a pipeline register for storing write data was identified. Because this required complicated hardware control logic and large amounts of hardware, the design and testing of a pipeline computer took a great deal of time.

BRIEF SUMMARY OF THE INVENTION

It is therefore an object of the present invention to solve the above-mentioned problem by adopting a bypass control mechanism for a pipeline computer which reduces the amount of hardware and shortens the processes of hardware design and verification.

It is a further object of the present invention to reduce an amount of hardware and shorten a design process and verification by assigning all or part of bypass control to software.

It is a further object of the present invention to address a disorder in pipeline operation of a data processing device such as a processor interrupt, by maintaining logical operation in a parallel processing hardware architecture.

It is a further object of the present invention to provide a data processing device with a pipeline bypass function which suppresses an increase in software load while reducing an amount of hardware.

It is an even further object of the present invention to analyze dependency of instructions in a limited range of a processing device with a pipeline bypass function and reduce an operation load more than in complete software bypass control.

It is a further object of the present invention to provide a data processing device having a pipeline bypass function which enables programming without wasting a register.

It is still a further object of the present invention to assign all or part of bypass control in a data processing device having a bypass function to software rather than hardware, to reduce an amount of hardware required and shorten a design and verification processes.

Objects of the present invention are achieved by a data processing device having a pipeline mechanism to execute instructions by pipeline processing, including a bypass to pass an operation result of a preceding instruction to a succeeding instruction as a source operand before writing the operation result to a register, wherein an instruction has a bypass specification field to indicate whether its source operand is to be received from the bypass or the register; and a source operand selector to select the source operand from the register or the bypass according to the bypass specification field.

Objects of the present invention are further achieved by a data processing device to read operand data from a first register using a pipeline mechanism, execute instruction operations by pipeline processing, and write operation results into a second register, including a plurality of bypasses to pass an operation result of a preceding instruction to a succeeding instruction as a source operand before writing the operation result to the second register, wherein the succeeding instruction has a source operand reception bypass specification field and a source operand register field; and a source operand selector to select the first register or one of the plurality of bypasses according to a value in the source operand reception bypass specification field.

Objects of the present invention are achieved by a data processing device to read operand data from a first register with a pipeline mechanism, execute instruction operations by pipeline processing, and write operation results into a second register, including a plurality of bypasses to pass an operation result of a preceding instruction to a succeeding instruction as a source operand before writing the operation result to the second register, wherein a bypass number is allocated to each of the plurality of bypasses and the succeeding instruction includes a operand register field specifying a bypass number; and a source operand selector to select the first register or one of the plurality of bypasses according to the bypass number in the source operand register field.

Further objects of the present invention are achieved by a data processing device of a VLIW-type computer executing multiple slot instructions simultaneously, the data processing device to read operand data from a first register using a pipeline mechanism, execute instruction operations by pipeline processing, and write operation results into a second register for each slot, including a plurality of bypasses to pass an operation result of each slot to a succeeding instruction of the same or a different slot before writing the operation result to the second register, wherein the succeeding instruction has a source operand reception bypass specification field, a source operand reception slot specification field, and a source operand register field; and a source operand selector to select the first register or one of the plurality of bypasses according to values in the source operand reception bypass specification field and source operand reception slot specification field of the preceding instruction.

Even further objects of the present invention are achieved by a data processing device of a VLIW-type computer, the data processing device to execute multiple slot instructions simultaneously, read operand data from a first register using a pipeline mechanism, execute instruction operations by pipeline processing, and write operation results into a second register for each slot, including a plurality of bypasses to pass an operation result of each slot to a succeeding instruction of the same or different slot before writing the operation result to the second register, wherein the succeeding instruction has a source operand register field having a number corresponding to one of the plurality of bypasses; and a source operand selector to select the first register or the one of the plurality of bypasses from the slots according to the number in the source operand register field.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 9(a), 9(b), and 9(c) illustrate pipeline control of a data processing device according to the fourth embodiment of the present invention.

FIGS. 16(a), 16(b), 16(c), 16(d), and 16(e) illustrate bypass effects of a pipeline computer according to the present invention.

DETAILED DESCRIPTION OF THE PREFERRED EMBODIMENTS

Figure 1:
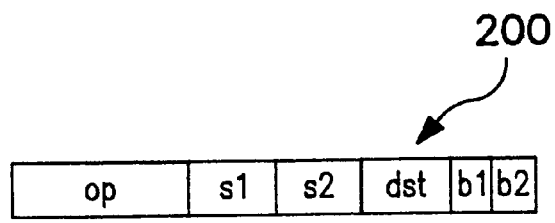
FIG. 1 is a schematic view of an instruction code format for a data processing device according to a first embodiment of the present invention.

Reference will now be made in detail to the preferred embodiments of the present invention, examples of which are illustrated in the accompanying drawings, wherein like reference numerals refer to like elements throughout.

First Embodiment

FIG. 1 is a schematic view of an instruction code format of an instruction code used in a data processing device according to a first embodiment of the present invention. As illustrated, instruction code format 200 includes an instruction type field (op), a register number specification field (s1) for the first source operand, a register number specification field (s2) for the second source operand, a register number specification field (dst) for the target operand, a bypass information specification field (b1) for the first source operand, and a bypass information specification field (b2) for the second source operand.

Figure 2:
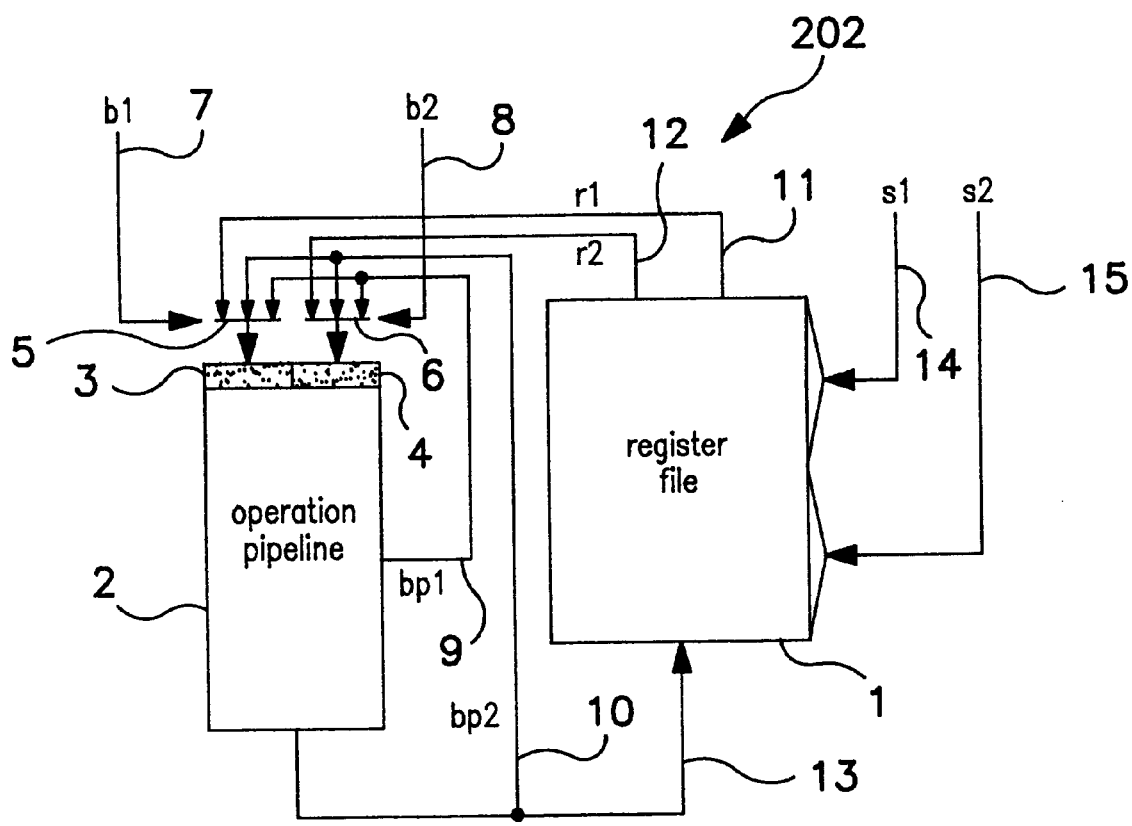
FIG. 2 is a schematic view of a circuit configuration of a data processing device according to the first embodiment of the present invention.

FIG. 2 is a schematic view of a circuit configuration of a data processing device according to the first embodiment of the present invention. As illustrated, data processing device 202 includes a register file (1), an operation pipeline (2), a pipeline register (3) for storing the first source operand, a pipeline register (4) for storing the second source operand, a selector (5) for inputting data to the pipeline register (3), a selector (6) for inputting data to the pipeline register (4), a select signal line (7) prescribed by the value in field b1 in FIG. 1, a select signal line (8) prescribed by the value in field b2 in FIG. 1, a bypass line (9) for output from the intermediate stage of operation pipeline (2), a bypass line (10) for output from the last stage of operation pipeline (2), a first source operand signal line (11), a second source operand signal line (12), a target operand signal line (13), a first operand signal line (14) prescribed by the value in field s1 in FIG. 1, and a second operand signal line (15) prescribed by the value in field s2 in FIG. 1. Although not shown in FIG. 2, a target operand address signal prescribed by the value in field dst in FIG. 1 is set in register file 1.

The values of fields s1 and s2 in FIG. 1 are set in the register file (1) and the register values of their corresponding numbers are output to the first source operand signal line r1 (11) and the second source operand signal line r2 (12). If an operation result is confirmed in the middle of the pipeline (2), bypass line bp1 (9) passes the result. Bypass line bp2 (10) is branched from a path that is used to write the operation result of the pipeline (2) to the register file (1).

The value of field b1 in FIG. 1 or its decoded value is set in select signal line b1 (7) and the value of field b2 in FIG. 1 or its decoded value is set in select signal line b2 (8) to use them as select signals for the selectors (5, 6).

By select signal line b1 (7), the selector (5) selects the first source operand signal line r1 (11), bypass line bp1 (9), or bypass line bp2 (10) as the first source operand. By select signal line (8), the selector (6) selects the second source operand signal line r2 (12), bypass line bp1 (9), or bypass line bp2 (10) as the second operand.

The values of fields b1 and b2 in the instruction code uniquely determine those of select signal lines b1 (7) and b2 (8). This embodiment is based upon a system that is programmed after a register or bypass is identified as a read value source at the source operand read cycle.

Although only two paths are used as bypasses in this embodiment, it is easy to increase the number of bypasses according to the configuration of the operation pipeline. Under some circumstances, however, only one specific bypass can be adopted.

Second Embodiment

Figure 3:
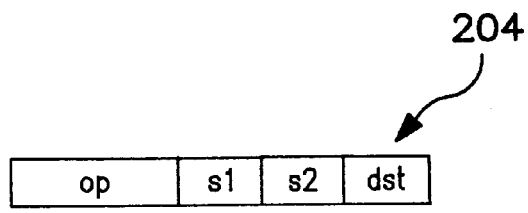
FIG. 3 is a schematic view of an instruction code format of an instruction code used in a data processing device according to a second embodiment of the present invention.

FIG. 3 is a schematic view of an instruction code format 204 for a data processing device according to a second embodiment of the present invention. In FIG. 3, fields op and dst are the same as those in the first embodiment. However, in the second embodiment, a number similar to the register number is allocated to each bypass and fields s1 and s2 specify the two register numbers or bypasses as source operands.

Figure 4:
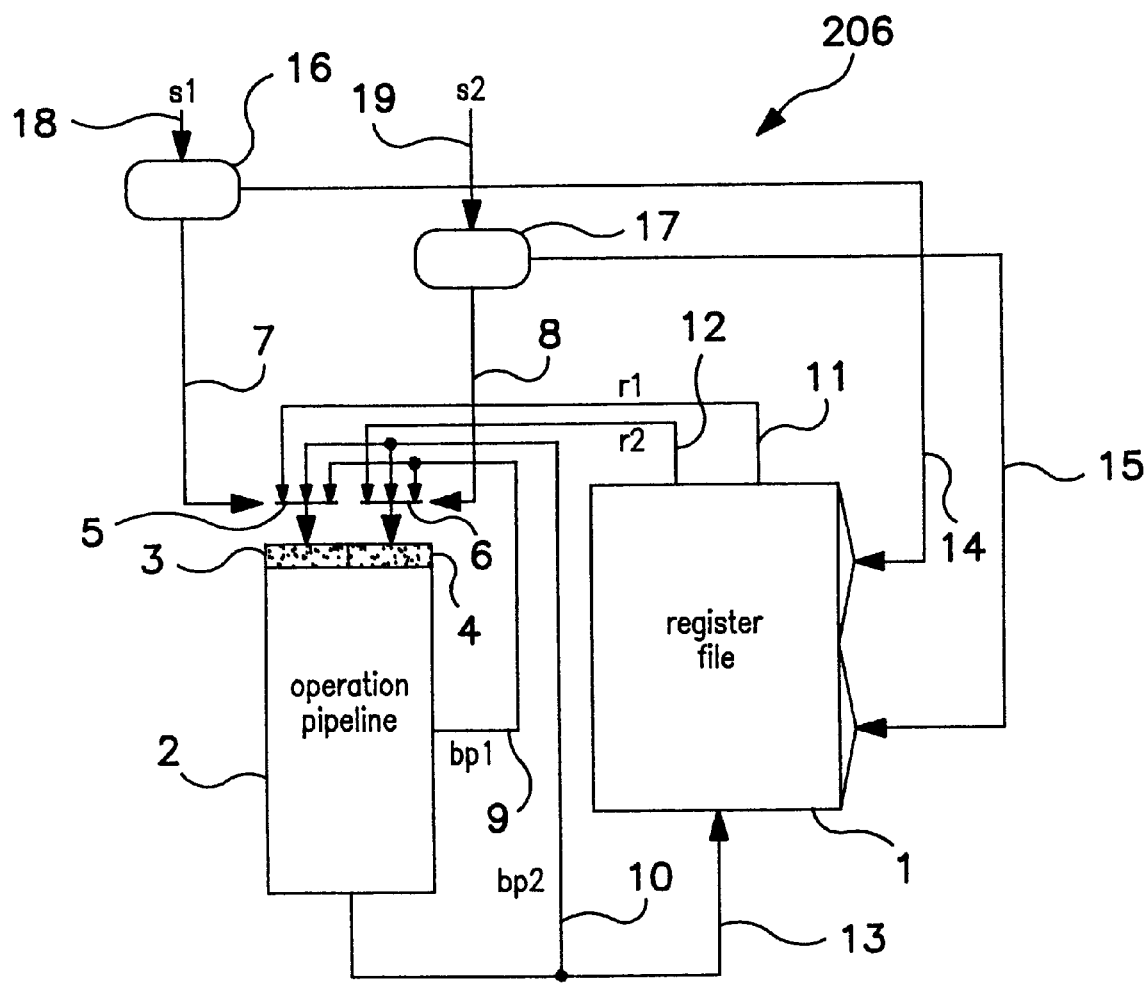
FIG. 4 is a schematic view of a circuit configuration of a data processing device according to the second embodiment of the present invention.

FIG. 4 is a schematic view of a circuit configuration of a data processing device 206 according to the second embodiment of the present invention. In FIG. 4, the components that correspond to those in FIG. 2 have identical numbers. The other components are logical circuits (16, 17), a field s1 signal line (18), and a field s2 signal line (19).

The field s1 value is input to the logical circuit (16). If s1 indicates a register number, the number is output to the first source operand signal line (14) as an address to the register file (1), and the value from the select signal line (7) is used to select the first source operand signal r1 (11). If s1 indicates a bypass number, the value from the select signal line (7) is used to select a bypass.

The logical circuit (17) operates in the same way as the logical circuit (16) and outputs a signal according to the value of field s2. The other operations are the same as those of the circuit of the first embodiment.

Third Embodiment

The third embodiment of the present invention is applied to a computer having a four-parallel Very Long Instruction Word (VLIW) architecture.

Figure 5:
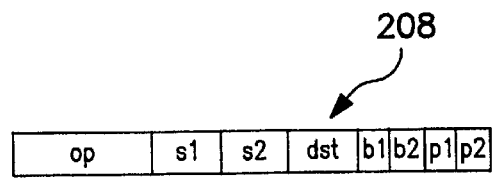
FIG. 5 is a schematic view of an instruction code format of an instruction code used in a data processing device according to a third embodiment of the present invention.

FIG. 5 is a schematic view of an instruction code format 208 for a data processing device according to the third embodiment of the present invention. In FIG. 5, four codes are connected to form one VLIW instruction. Fields op, s1, s2, dst, b1, and b2 are the same as those in the first embodiment. Field p1 specifies the first source operand read slot and field p2 specifies the second source operand read slot.

Figure 6:
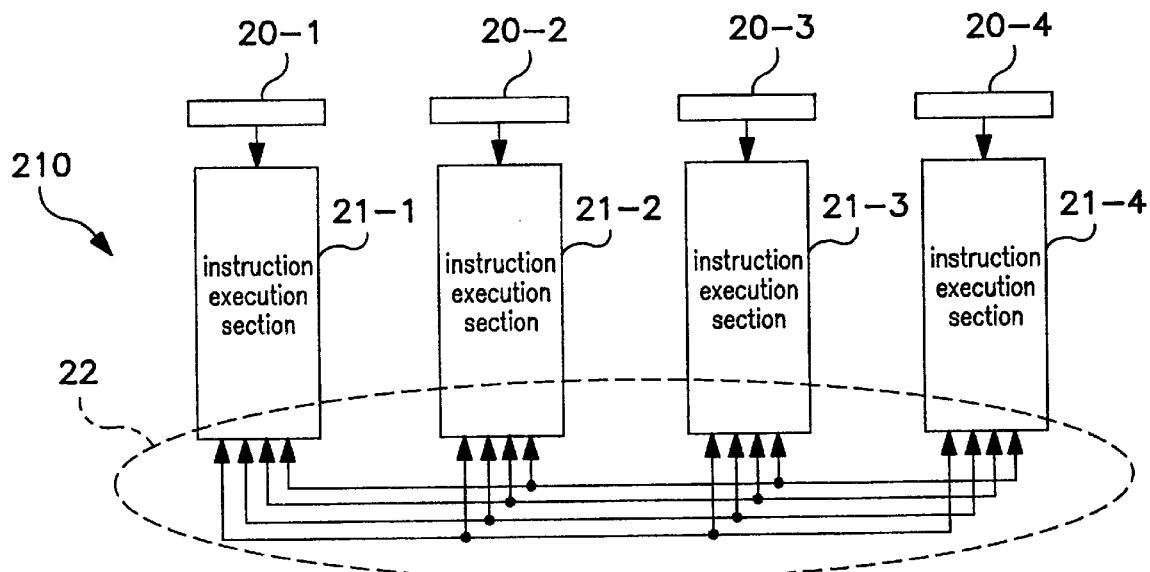
FIG. 6 is a block diagram illustrating an implementation of a data processing device according to the third embodiment of the present invention.

FIG. 6 is a block diagram illustrating an implementation of a data processing device 210 according to the third embodiment of the present invention. FIG. 6 includes instruction codes (20-1–20-4), instruction execution sections (21-1 to 21-4), and a bypass signal (22) exchanged between slots.

Each instruction execution section (21-1 to 21-4) has the same internal configuration as the first embodiment illustrated in FIG. 2 and the second embodiment illustrated in FIG. 4. In addition to the bypass signals of local slots, those of other slots are also candidates for source operands. Each instruction execution section selects the bypass signals of the slots determined by p1 and p2 as source operands.

Figure 7:
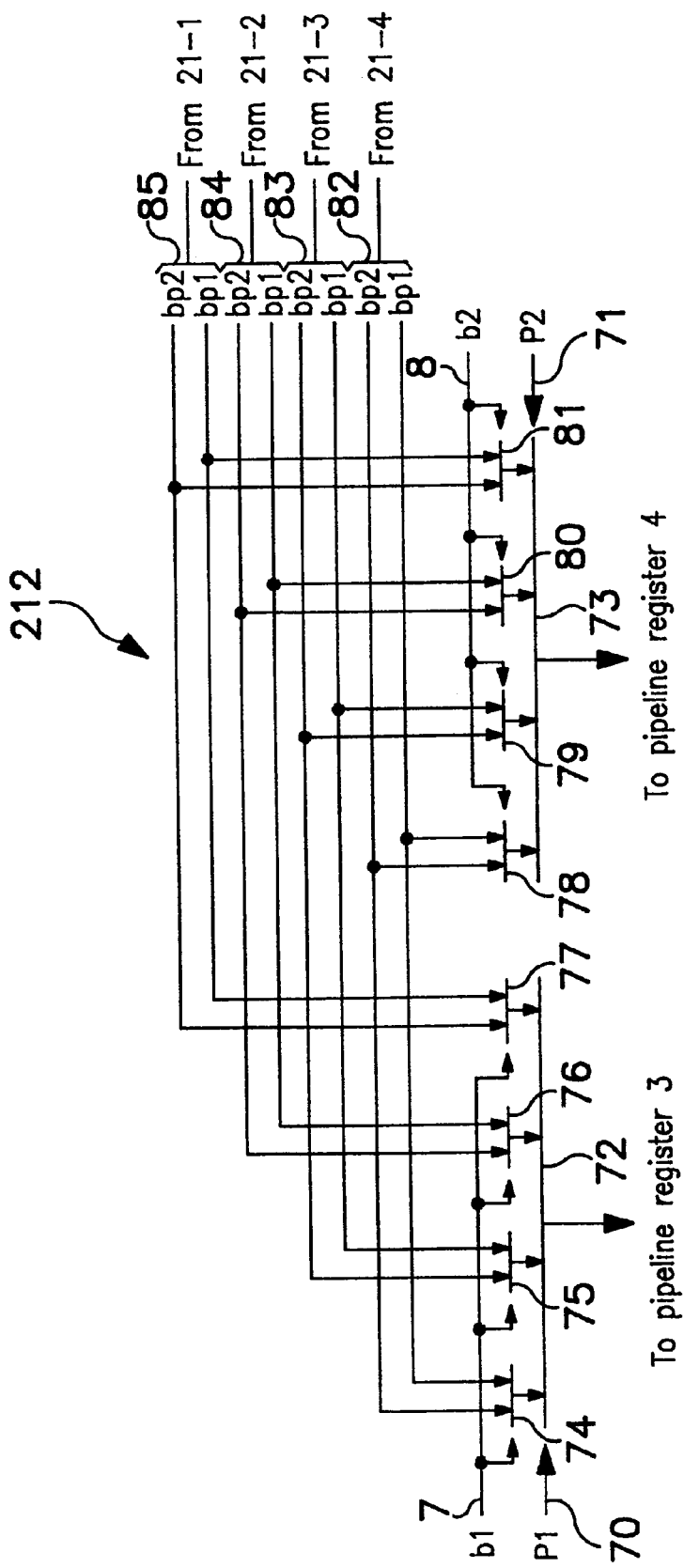
FIG. 7 is a schematic view of a circuit configuration of a bypass selector according to the third embodiment of the present invention.

FIG. 7 is a schematic view of a circuit configuration of a bypass selector 212 according to the third embodiment of the present invention. FIG. 7 more particularly illustrates a select signal line (7) prescribed by the value of field b1, a select signal line (8) prescribed by the value of field b2, a select signal line (70) prescribed by the value of field p1, a select signal line (71) prescribed by the value of field p2, a selector (72) to select a slot for reading the first source operand, a selector (73) to select a slot for reading the second source operand, selectors (74–81) corresponding to the slots for selecting bypass lines, and signals (82–85) from the slots. In this figure, a pair of signals from the signal lines (82–85) is output from inside a local slot and the other three pairs are supplied from external slots. The source operand signal lines from the register file are omitted in this figure.

By numbering the bypasses as illustrated in the above second embodiment, fields b1, b2, p1, and p2 shown in FIG. 5 can be omitted and control is implemented using only fields s1 and s2.

In FIG. 6, all slots are bypassed. The present invention, however, need not be limited to the embodiment because partial bypasses are acceptable. The degree of parallelism is not limited to 4.

Fourth Embodiment

The above embodiments are based on the assumption that the pipeline-level operations are already known. However, in an actual processor, an interrupt and other factors may cause a disorder in a pipeline operation. This embodiment shows an application of the present invention to a processor that may suffer from this kind of disorder.

Figure 8:
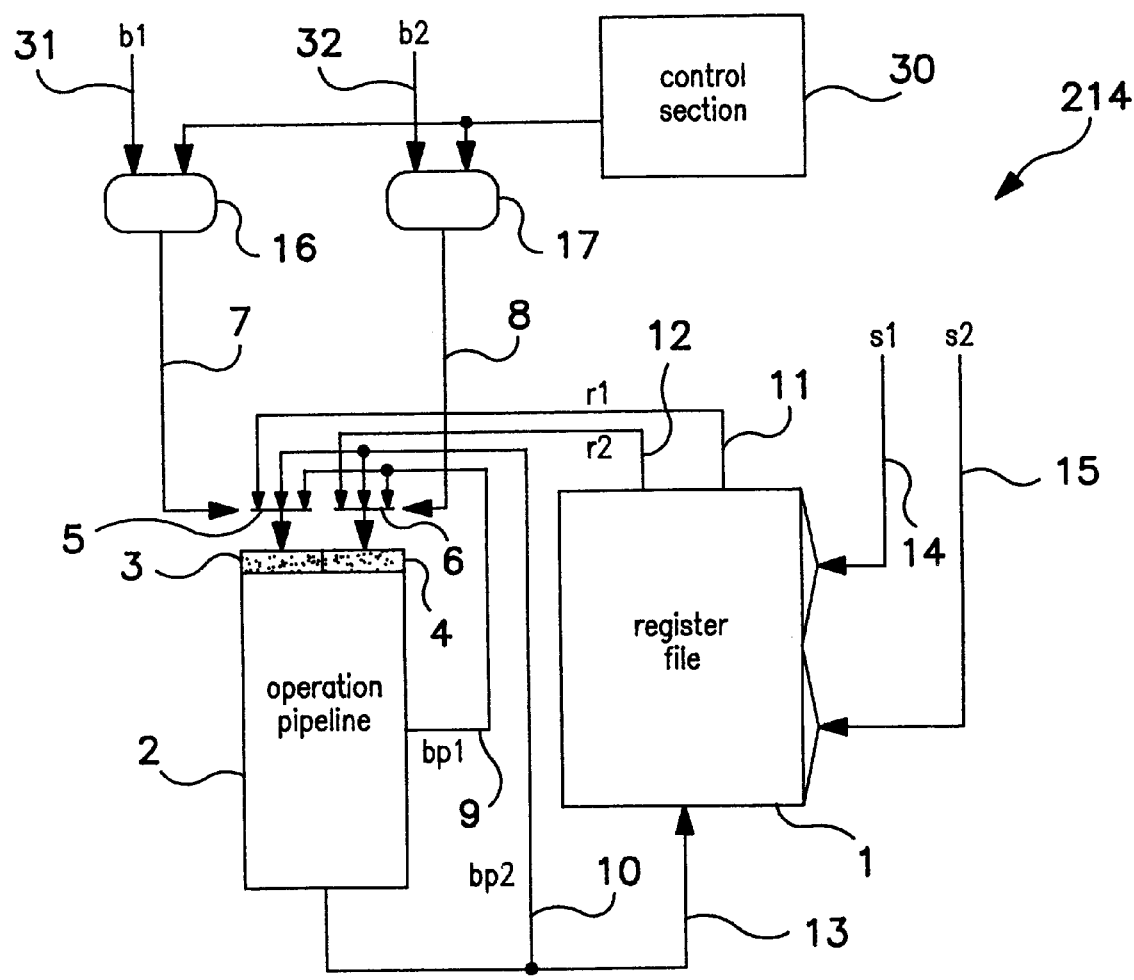
FIG. 8 is a schematic view of a circuit configuration of a data processing device according to a fourth embodiment of the present invention.

FIG. 8 is a schematic view of a circuit configuration of a data processing device 214 according to the fourth embodiment of the present invention. FIG. 8 illustrates the circuit of the fourth embodiment. In FIG. 8, the components corresponding to those in FIG. 2 have the same numbers. The other components are logical circuits (16, 17), a control section (30), a field b1 signal line (31), and a field b2 signal line (32). The circuit in FIG. 8 has the configuration shown in FIG. 2, plus logical circuits (16, 17) and a control section (30).

If a pipeline disorder occurs and a preceding instruction is not located at an assumed position on the pipeline when a source operand read timing instruction is issued, the control section (30) freezes the source operand read processing until the preceding instruction writes all the operation results into a register. Although the processing is later restarted, logical circuits (16, 17) select the first source operand signal line r1 (11) and the second source operand signal line r2 (12) with the select signals (7, 8) to ensure correct program operations.

FIG. 9(a) illustrates the instruction status in a pipeline with no disorders. The arrows in FIG. 9(a) indicate data transfer through the bypasses. Instruction 2 specifies bypass read from stage E1 in the instruction code. Instructions 3 and 4 specify bypass read from stage E2.

FIG. 9(b) illustrates the instruction status in the pipeline with a disorder. If the fetch processing of instruction 2 is delayed by one cycle and stage D is set at t3, the correct value cannot be read from the E1 bypass at t3. Pipeline freezing is used to wait for the completion of an instruction, e.g. instruction 1, preceding a second instruction, e.g. instruction 2. Execution of instruction 2 and subsequent instructions is restarted from t5. Instructions 2 and 3 are changed to read a source operand from a register. Instruction 4 reads a source operand from the E2 bypass as usual because the relationship with instruction 2 is the same as normal.

When the execution sequence is changed from FIG. 9(a) to FIG. 9(b), the control section (30) controls the processing by the following algorithm:

Times t3 and t4: Freezes stage D of instruction 2.

Time t5: Melts stage D and changes all the bypasses to registers.

Time t6: Changes bypasses E2 and W to registers.

Time t7: Changes bypass W to a register.

Time t8 or later: Returns to normal.

The control section (30) can be made more intelligent. The processing may be restarted before the preceding instruction ends. For example, if the preceding instruction is not at the position for outputting the result to bypass line bp1 (9) but has advanced to the position for outputting the result to the bypass line bp2 (10), the logical circuits (16, 17) can be controlled to make the select signals (7, 8) select the bypass line bp2 (10).

FIG. 9(c) illustrates the control section (30) made more intelligent to continue processing without freezing stage D of instruction 2.

In FIG. 9(c), instruction 2 is changed to bypass E2 and instruction 3 to bypass W. Then the control section (30) controls the processing by the following algorithm:

Time t3: Changes bypasses E1 to E2, E2 to W, and W to register.

Time t4: Changes bypasses E2 to W and W to register.

Time t5: Changes the bypass W to register.

Time t6 or later: Returns to normal.

Fifth Embodiment

In the above embodiments, all the bypass specifications are assigned to software. These embodiments offer the advantage of simplifying hardware, trading off with the disadvantage of increasing the load on the compiler or assembler programmer. On the other hand, this embodiment is positioned in the middle between complete hardware control used in conventional processors and complete software control used in the above embodiments. The purpose of this embodiment is to suppress an increase in the software load while reducing the amount of hardware.

Figure 10:
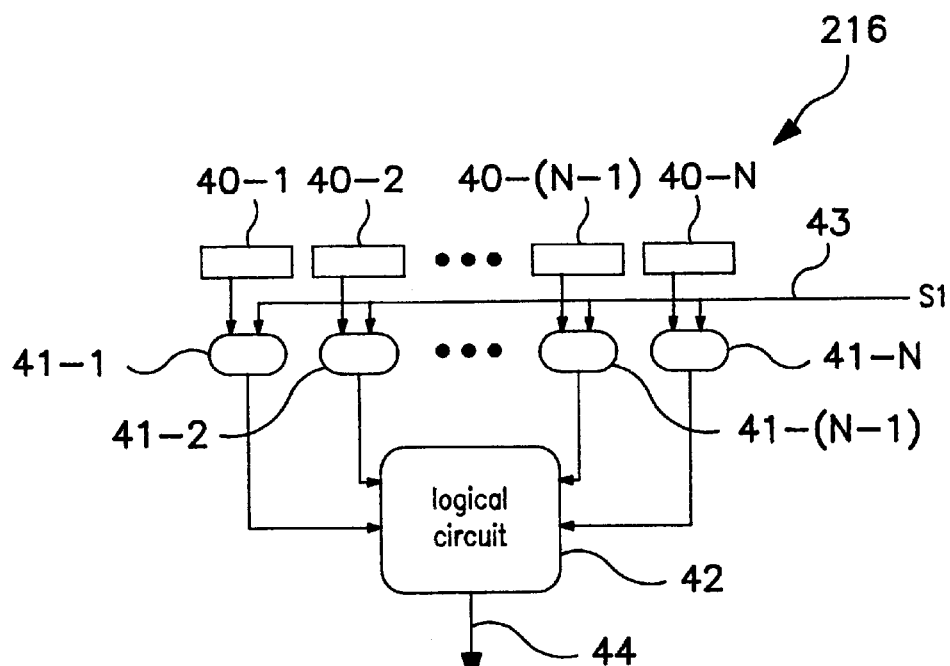
FIG. 10 (prior art) is a schematic view of a conventional bypass control circuit.

FIG. 10 (prior art) is a schematic view of a conventional bypass control circuit. FIG. 10 illustrates conventional bypass control circuit 216 with N candidates for bypasses, namely registers (40-1–40-N) where target register numbers are held for storing the data of N bypasses. An operand number s1 (43) is present in the instruction code, and compare circuits (41-1–41-N) compare the operand number s1 (43) with the registers (40-1–40-N) and output a one-bit signal indicating a match. A logical circuit (42) then outputs a signal indicating the smallest target register number matching or a mismatch signal to the signal line (44). The signal line (44) corresponds to select signal line b1 (7) in the first embodiment shown in FIG. 2.

Figure 11:
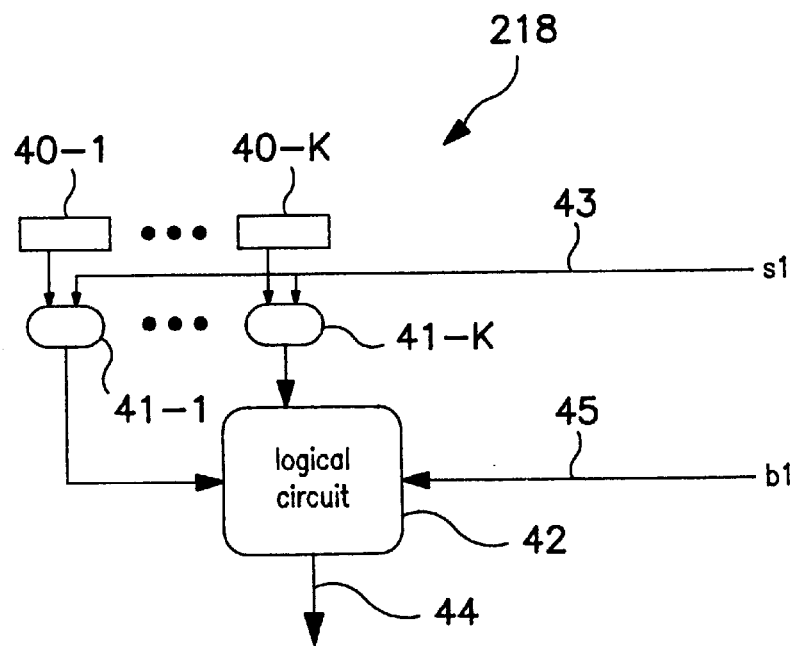
FIG. 11 is a schematic view of a circuit configuration of a data processing device according to a fifth embodiment of the present invention.

FIG. 11 is a schematic view of a circuit configuration of a data processing device 218 according to a fifth embodiment of the present invention. Although the number of registers and compare circuits in the conventional circuit shown in FIG. 10 is limited to k, signal b1 indicates matching in the range of the omitted registers from K+1 to N, to provide the same function as the configuration shown in FIG. 10.

Since the software should analyze dependency of instructions in only a limited range, this configuration reduces the load more than does complete software bypass control.

Signal lines s1 (43) and b1 (45) in FIG. 11 may be considered the same as those in the instruction code of the first embodiment above. The logical circuit (42) in FIG. 11 outputs signals to identify N+1 cases for reading signals from N bypasses and from a register without using bypasses.

Signal line b1 (45) inputs a signal to the logical circuit (42) for identifying N−K+2 cases:

(1) Reading from a register (2) Using a bypass from 1 to K (3) Using bypass K+1

(4) Using bypass K+2

●●●

(N−K+2) Using bypass N

The algorithm of the logical circuit (42) is as follows:
(a) If the signal (45) is other than (2) above:
Outputs a select signal of the same meaning.
(b) If the signal (45) is (2) above:
Outputs a select signal to select a matching bypass of the smallest number from 41-1 to 41-K or a select signal to indicate register read if there is no matching bypass.

Sixth Embodiment

Figure 12:
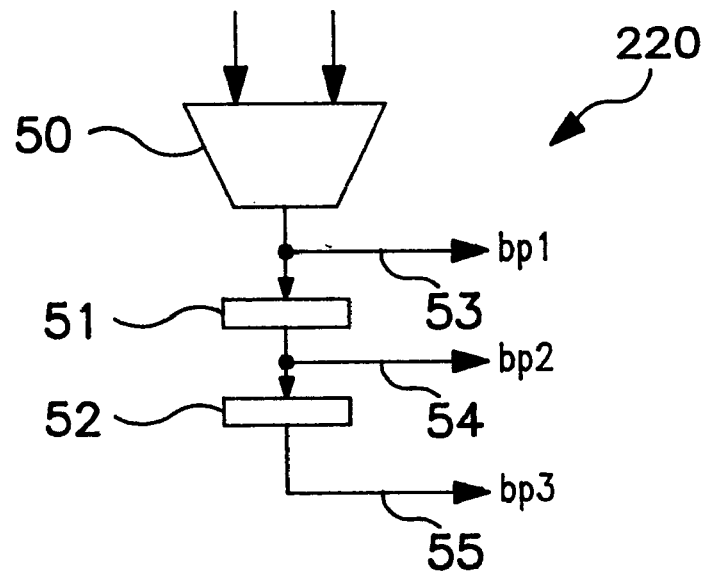
FIG. 12 is a schematic view of a circuit configuration of a data processing device according to a sixth embodiment of the present invention.

The sixth embodiment includes a circuit that strengthens the instruction set by applying the present invention. FIG. 12 is a schematic view of a circuit configuration of a data processing device 220 according to a sixth embodiment of the present invention. FIG. 12 illustrates an address calculator (50), pipeline registers (51, 52), and bypasses (53–55). If a Load instruction or a Store instruction is executed, the cache or memory is accessed according to the effective address calculated by the address calculator (50). This example makes the effective address available as a source operand for a succeeding instruction by one of the above embodiments. This enables the passing of an effective address to a succeeding instruction without wasting a register.

When using the sum of a base value and an offset value (b+offset), for example, the conventional technology calculates the sum first in (1) and issues a Load instruction of (2) with the result as the base register, as follows:

add r0, b, offset (1)
ld r1, r0, 0 (2)
Succeeding instruction r0 (3)

For the source operand, the succeeding instruction uses register r0 where the effective address has been stored.

On the other hand, the present invention reduces the above processing to the following:

add r0, b, offset (1)
Succeeding instruction bypass (2)

The present invention has two advantages: the elimination of one instruction and not destroying register r0.

Although set to (3) here, the number of pipeline stages may be changed according to the processor configuration.

Seventh Embodiment

Figure 13:
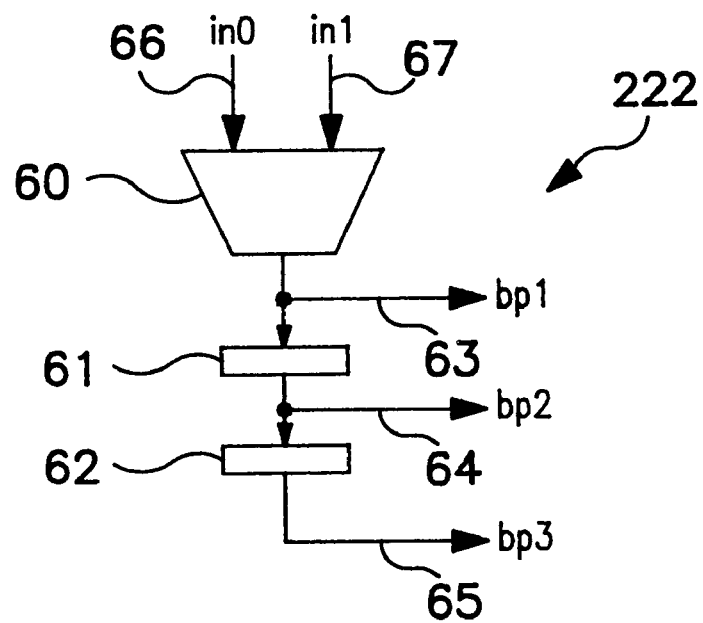
FIG. 13 is a circuit configuration of a data processing device according to a seventh embodiment of the present invention.

The seventh embodiment includes another circuit that strengthens the instruction set by applying the present invention. FIG. 13 is a circuit configuration of a data processing device 222 according to a seventh embodiment of the present invention. Data processing device 222 includes a target address calculator (60), pipeline registers (61, 62), bypasses (63–65), and original data (66, 67) for calculating a target address. For register-relative branching, the data corresponds to a register value and an offset value.

A branch instruction transfers control to an instruction that uses a target address calculated by target address calculator (60) as a program counter. In this embodiment, a target address is sent to the bypasses (63–65) for a succeeding instruction to use as a source operand. However, the number of pipeline stages is not limited to the embodiment shown in FIG. 13.

Eighth Embodiment

Figure 14:
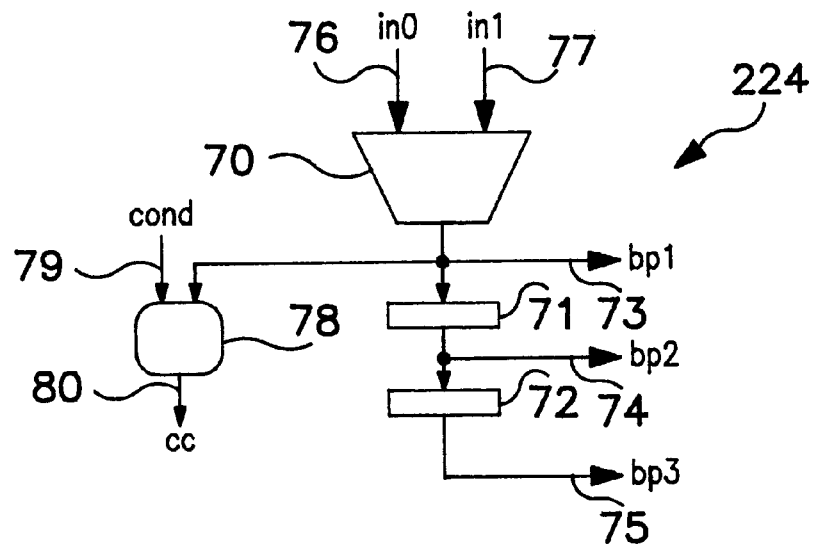
FIG. 14 is a circuit configuration of a data processing device according to an eighth embodiment of the present invention.

The eighth embodiment includes another circuit that strengthens the instruction set by applying the present invention. FIG. 14 is a circuit configuration of a data processing device 224 according to an eighth embodiment of the present invention. FIG. 14 illustrates a subtraction circuit (70), pipeline registers (71, 72), bypasses (73–75), input data lines (76, 77), a condition code generation circuit (78), a compare condition signal line (79), and a generated condition code signal line (80).

A compare instruction inputs two data items from the input data lines (76, 77) for comparison and subtracts the values at the subtraction circuit (70). Based on the subtraction result and a compare condition from the compare condition signal line (79), the condition code generation circuit (78) generates a condition code and outputs it to the condition code signal line (80).

In this embodiment, the subtraction result is sent to the bypasses (73–75) with a compare instruction for a succeeding instruction to use as a source operand. The number of pipeline stages is not limited to the embodiment shown in the FIG. 14.

Ninth Embodiment

Figure 15:
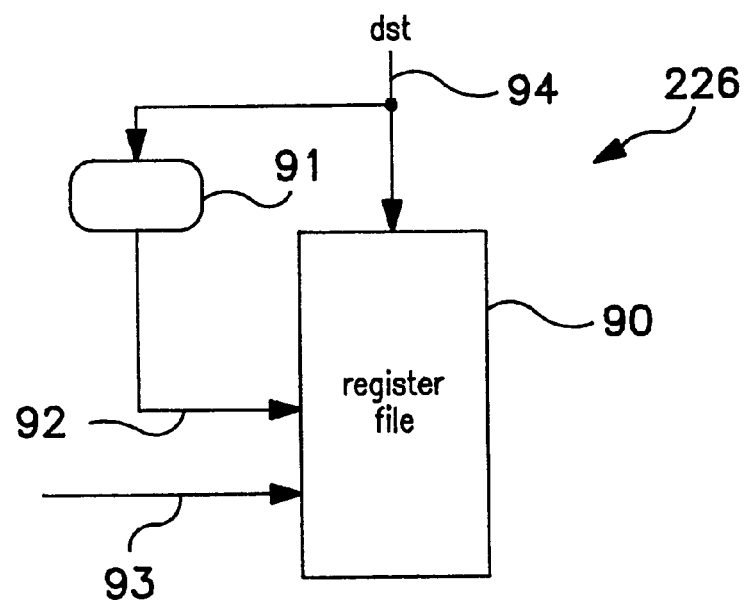
FIG. 15 is a circuit configuration of a data processing device according to a ninth embodiment of the present invention.
Figure 17:
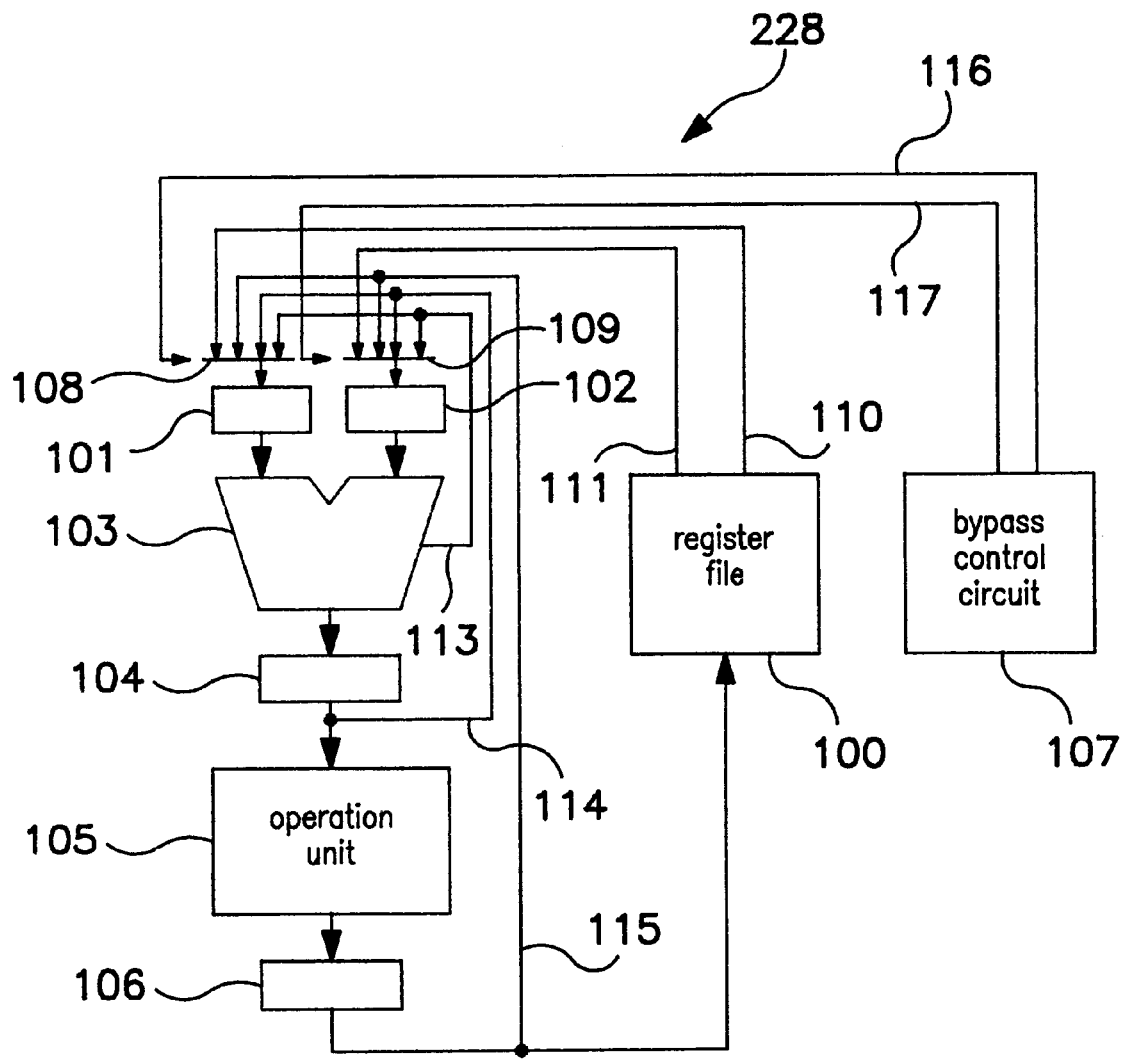
FIG. 17 (prior art) is a schematic view of a circuit configuration of a conventional pipeline computer using a bypass circuit.

The ninth embodiment includes another circuit that strengthens the instruction set by applying the present invention. FIG. 15 is a circuit configuration of a data processing device 226 according to a ninth embodiment of the present invention. FIG. 15 illustrates a register file (90), a logical circuit (91), a write inhibit signal (92), write data (93), and a target register number dst (94) in an instruction code.

Usually, write data (93) is written into the register having a number determined by the value of dst. If the value of dst is specific, the logical circuit (91) asserts the write inhibit signal (92) and inhibits writing. An instruction having a specific value in field dst does not write a register. Since bypass is enabled, an operation result can be passed to a succeeding instruction.

This embodiment enables programming without wasting a register. In addition by assigning all or part of bypass control to software rather than hardware, this invention reduces amount of hardware required and shortens the design and verification processes.

The first configuration of the present invention includes a bypass to pass the operation result of a preceding instruction to a succeeding instruction as a source operand before writing to a register, where a bypass specification field is provided in a instruction code for indicating that a source operand is to be received from the bypass, and a source operand selector to select data either from a register or a bypass as a pipeline input data according to a value in the bypass specification field.

The second configuration of the present invention includes a plurality of bypasses to pass the operation result of a preceding instruction to a succeeding instruction as a source operand before writing to a register, where a source operand reception bypass specification field is provided as well as a source operand register field in a instruction code, and a source operand selector selects data either from a register or a plurality of bypasses as a pipeline input data according to a value in the bypass specification field.

The third configuration of the present invention includes a plurality of bypasses to pass the operation result of a preceding instruction to a succeeding instruction as a source operand before writing to a register, where a number different from the register number is allocated to each bypass for specifying a source operand register field in the instruction code as a number in the number space including a bypass, and a source operand selector selects data either from a register or a plurality of bypasses as a pipeline input data according to a value in the bypass specification field.

The fourth configuration of the present invention is applicable to a VLIW-type computer executing multiple slot instructions simultaneously, including a plurality of bypasses to pass the operation result of each slot to a succeeding instruction of the same or different slot before writing to a register, where a source operand reception bypass specification field and a source operand reception slot specification field are provided as well as a source operand register field in an instruction code, and a source operand selector selects data either from a register or a plurality of bypasses from the slots as a pipeline input data according to a value in the bypass specification field and slot specification field.

The fifth configuration of the present invention is applicable to a VLIW-type computer executing multiple slot instructions simultaneously, including a plurality of bypasses to pass the operation result of each slot to a succeeding instruction of the same or different slot before writing to a register, where a number different from the register number is allocated to each bypass for specifying a source operand register field in the instruction code as a number in the number space including a bypass, and a source operand selector selects data either from a register or a plurality of bypasses from the slots as a pipeline input data according to a value in the bypass specification field.

The sixth configuration of the present invention includes of a pipeline disorder detection mechanism, a source operand read freeze mechanism, and a switching mechanism to receive a source operand not from a bypass but from a register, where source operand read is frozen by the source operand freeze mechanism when a pipeline disorder is detected by the detection mechanism and source operand read source is switched to a register by the switching mechanism when the processing is restarted.

The seventh configuration of the present invention includes a pipeline disorder detection mechanism and a switching mechanism to receive a source operand not from a bypass specified by an instruction code but from a different bypass, where the source operand read source is switched by the switching mechanism from a bypass specified by an instruction code to a different bypass depending on the degree of disorder if a pipeline disorder is detected by the pipeline disorder detection mechanism.

The eighth configuration of the present invention includes a bypass specification field in an instruction code which specifies only part of the bypasses possible as source operands, and other bypass selections is performed by a hardware circuit.

The ninth configuration of the present invention has an effective address calculated by a Load instruction or a Store instruction in an instruction set obtained through a bypass as a source operand for a succeeding instruction.

The tenth configuration of the present invention has a target address calculated by a Branch instruction in an instruction set obtained through a bypass as a source operand for a succeeding instruction.

The eleventh configuration of the present invention has a difference between two values compared by a Compare instruction in an instruction set obtained through a bypass as a source operand for a succeeding instruction.

The twelfth configuration of the present invention has a field in the instruction code for specifying not to store an operation result into a register, where an operation result is not written into a register according to the specification but given to a succeeding instruction through a bypass as a source operand.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A data processing device having a pipeline mechanism to execute an instruction by pipeline processing, comprising:

a bypass to pass an operation result of a preceding instruction to a succeeding instruction as a source operand before writing the operation result to a register, wherein the succeeding instruction has a bypass specification field to indicate whether the source operand is to be received from the bypass or the register; and a source operand selector to select the source operand from the register or the bypass according to the bypass specification field.

2. The data processing device according to claim 1, wherein the source operand selector selects the source operand from the bypass or the register during a source operand read operation, the data processing device further comprising:

pipeline disorder detection means for detecting a pipeline disorder; and source operand read freeze means for freezing the source operand read operation, wherein the source operand read operation is frozen by said source operand read freeze means until the completion of writing the operation result into the register when a pipeline disorder is detected by said pipeline disorder detection means and said source operand selector selects the register when the pipeline processing is restarted.

3. The data processing device according to claim 2, wherein said pipeline disorder detection means detects a degree of disorder; and said source operand selector receives a source operand from a second bypass not specified by the bypass specification field of the succeeding instruction in response to the degree of disorder detected by said pipeline disorder detection means.

4. The data processing device according to claim 1, wherein the bypass specification field of the succeeding instruction specifies possible bypasses to be used as source operands and additional bypass selection of the possible bypasses is performed by hardware.

5. The data processing device according to claim 1, wherein the preceding instruction is a load instruction or a store instruction which calculates an effective address, and the effective address is obtained through the bypass as the source operand for the succeeding instruction.

6. The data processing device according to claim 1, wherein the preceding instruction is a branch instruction which calculates a target address, and the target address is obtained through the bypass as the source operand for the succeeding instruction.

7. The data processing device according to claim 1, wherein the preceding instruction is a compare instruction and the difference between two values compared by the compare instruction is obtained through the bypass as the source operand for the succeeding instruction.

8. The data processing device according to claim 1, wherein the preceding instruction includes a field for specifying not to store the operation result into the register, and the operation result is provided to the succeeding instruction by the bypass as the source operand.

9. A data processing device having a pipeline mechanism to execute an instruction by pipeline processing, comprising:

a plurality of bypasses to pass an operation result of a preceding instruction to a succeeding instruction as a source operand before writing the operation result to a register, wherein the succeeding instruction has a source operand reception bypass specification field which is independent of a source operand register field; and a source operand selector to select the source operand from the register or one of the plurality of bypasses according to a value in the source operand reception bypass specification field.

10. The data processing device according to claim 9, wherein the preceding instruction is a branch instruction which calculates a target address, and the target address is obtained through said one of said plurality of bypasses as the source operand for the succeeding instruction.

11. The data processing device according to claim 9, wherein the preceding instruction is a compare instruction and the difference between two values compared by the compare instruction is obtained through said one of said plurality of bypasses as the source operand for the succeeding instruction.

12. The data processing device according to claim 9, wherein the preceding instruction includes a field for specifying not to store the operation result into the register, and the operation result is provided to the succeeding instruction by said one of said plurality of bypasses as the source operand.

13. The data processing device according to claim 9, wherein the source operand selector selects the source operand from said one bypass of said plurality of bypasses or the register during a source operand read operation, the data processing device further comprising:

pipeline disorder detection means for detecting a pipeline disorder; and source operand read freeze means for freezing the source operand read operation, wherein the source operand read operation is frozen by said source operand read freeze means until the completion of writing the operation result into the register when a pipeline disorder is detected by said pipeline disorder detection means and said source operand selector selects the register when the pipeline processing is restarted.

14. The data processing device according to claim 13, wherein said pipeline disorder detection means detects a degree of disorder; and said source operand selector receives a source operand from a second bypass not specified by the value in the source operand reception bypass specification field in response to the degree of disorder detected by said pipeline disorder detection means.

15. The data processing device according to claim 9, wherein the source operand reception bypass specification field of the succeeding instruction specifies possible bypasses to be used as source operands and additional bypass selection of the possible bypasses is performed by hardware.

16. The data processing device according to claim 9, wherein the preceding instruction is a load instruction or a store instruction which calculates an effective address, and the effective address is obtained through said one bypass of said plurality of bypasses as the source operand for the succeeding instruction.

17. A data processing device having a pipeline mechanism to execute an instruction by pipeline processing, comprising:

a plurality of bypasses to pass an operation result of a preceding instruction to a succeeding instruction as a source operand before writing the operation result to a register, wherein a bypass number which is different from a register number is allocated to each of said plurality of bypasses and the succeeding instruction includes a source operand register field specifying the bypass number; and a source operand selector to select the source operand from the register or one of said plurality of bypasses according to the bypass number specified by the source operand register field.

18. The data processing device according to claim 17, wherein the preceding instruction is a compare instruction and the difference between two values compared by the compare instruction is obtained through said one of said plurality of bypasses as the source operand for the succeeding instruction.

19. The data processing device according to claim 17, wherein the preceding instruction includes a field for specifying not to store the operation result into the register, and the operation result is provided to the succeeding instruction by said one of said plurality of bypasses as the source operand.

20. The data processing device according to claim 17, wherein the source operand selector selects the source operand from said one of said plurality of bypasses or the register during a source operand read operation, the data processing device further comprising:

pipeline disorder detection means for detecting a pipeline disorder; and source operand read freeze means for freezing the source operand read operation, wherein the source operand read operation is frozen by said source operand read freeze means until the completion of writing the operation result into the register when a pipeline disorder is detected by said pipeline disorder detection means and said source operand selector selects the register when the pipeline processing is restarted.

21. The data processing device according to claim 20, wherein said pipeline disorder detection means detects a degree of disorder; and said source operand selector receives a source operand from a second bypass not specified by the source operand register field of the succeeding instruction in response to the degree of disorder detected by said pipeline disorder detection means.

22. The data processing device according to claim 17, wherein the source operand register field of the succeeding instruction specifies possible bypasses to be used as source operands and additional bypass selection of the possible bypasses is performed by hardware.

23. The data processing device according to claim 17, wherein the preceding instruction is a load instruction or a store instruction which calculates an effective address, and the effective address is obtained through said one of said plurality of bypasses as the source operand for the succeeding instruction.

24. The data processing device according to claim 17, wherein the preceding instruction is a branch instruction which calculates a target address, and the target address is obtained through said one of said plurality of bypasses as the source operand for the succeeding instruction.

25. A data processing device of a VLIW-type computer executing multiple slot instructions simultaneously for a plurality of slots, the data processing device having a pipeline mechanism to execute an instruction by pipeline processing for each slot, comprising:

a plurality of bypasses to pass an operation result of each slot to a succeeding instruction of the same or a different slot before writing the operation result to a register, wherein the succeeding instruction has a source operand reception bypass specification field, and a source operand reception slot specification field which are independent of a source operand register field; and a source operand selector to select the source operand from the register or one of said plurality of bypasses according to values in the source operand reception bypass specification field and source operand reception slot specification field of the succeeding instruction.

26. The data processing device according to claim 25, wherein the preceding instruction includes a field for specifying not to store the operation result into the register, and the operation result is provided to the succeeding instruction by said one of said plurality of bypasses as the source operand.

27. The data processing device according to claim 25, wherein the source operand selector selects the source operand from said one bypass of said plurality of bypasses or the register during a source operand read operation, the data processing device further comprising:

pipeline disorder detection means for detecting a pipeline disorder; and source operand read freeze means for freezing the source operand read operation, wherein the source operand read operation is frozen by said source operand read freeze means until the completion of writing the operation result into the register when a pipeline disorder is detected by said pipeline disorder detection means and said source operand selector selects the register when the pipeline processing is restarted.

28. The data processing device according to claim 27, wherein said pipeline disorder detection means detects a degree of disorder; and said source operand selector receives a source operand from a second bypass not specified by the succeeding instruction in response to the degree of disorder detected by said pipeline disorder detection means.

29. The data processing device according to claim 25, wherein the source operand reception bypass specification field in the succeeding instruction specifies possible bypasses to be used as source operands and additional bypass selection of the possible bypasses is performed by hardware.

30. The data processing device according to claim 25, wherein the preceding instruction is a load instruction or a store instruction which calculates an effective address, and the effective address is obtained through said one of said plurality of bypasses as the source operand for the succeeding instruction.

31. The data processing device according to claim 25, wherein the preceding instruction is a branch instruction which calculates a target address, and the target address is obtained through said one of said plurality of bypasses as the source operand for the succeeding instruction.

32. The data processing device according to claim 25, wherein the preceding instruction is a compare instruction and the difference between two values compared by the compare instruction is obtained through said one of said plurality of bypasses as the source operand for the succeeding instruction.

33. A data processing device of a VLIW-type computer executing multiple slot instructions simultaneously for a plurality of slots, the data processing device having a pipeline mechanism to execute an instruction by pipeline processing for each slot, comprising:

a plurality of bypasses to pass an operation result of each slot to a succeeding instruction of the same or different slot before writing the operation result to a register, wherein a bypass number which is different from a register number is allocated to each of said plurality of bypasses and the succeeding instruction has a source operand register field specifying the bypass number; and a source operand selector to select the source operand from the register or said one of said plurality of bypasses according to the number in the source operand register field.

34. The data processing device according to claim 33, wherein the source operand selector selects the source operand from said one of bypass said plurality of bypasses or the register during a source operand read operation, the data processing device further comprising:

pipeline disorder detection means for detecting a pipeline disorder; and source operand read freeze means for freezing the source operand read operation, wherein the source operand read operation is frozen by said source operand read freeze means until the completion of writing the operation result into the register when a pipeline disorder is detected by said pipeline disorder detection means and said source operand selector selects the register when the pipeline processing is restarted.

35. The data processing device according to claim 34, wherein said pipeline disorder detection means detects a degree of disorder; and said source operand selector receives a source operand from a second bypass not specified by the source operand register field in response to the degree of disorder detected by said pipeline disorder detection means.

36. The data processing device according to claim 33, wherein the source operand register field in the succeeding instruction specifies possible bypasses to be used as source operands and additional bypass selection of the possible bypasses is performed by hardware.

37. The data processing device according to claim 33, wherein the preceding instruction is a load instruction or a store instruction which calculates an effective address, the effective address is obtained through said one of said plurality of bypasses as the source operand for the succeeding instruction.

38. The data processing device according to claim 33, wherein the succeeding instruction is a branch instruction which calculates a target address, and the target address is obtained through said one of said plurality of bypasses as the source operand for the succeeding instruction.

39. The data processing device according to claim 33, wherein the preceding instruction is a compare instruction and the difference between two values compared by the compare instruction is obtained through said one of said plurality of bypasses as the source operand for the succeeding instruction.

40. The data processing device according to claim 33, wherein the preceding instruction includes a field for specifying not to store an operation result into the register, and the operation result is provided to the succeeding instruction by said one bypass of said plurality of bypasses as the source operand.

* * * * *

UNITED STATES PATENT AND TRADEMARK OFFICE
CERTIFICATE OF CORRECTION

PATENT NO.: 6,145,074
DATED : November 7, 2000
INVENTOR(S): Akira ASATO

It is certified that error appears in the above-identified patent and that said Letters Patent is hereby corrected as shown below:

On the title page, [54] Title, please change the Title to: --DATA PROCESSING DEVICE WITH PIPELINE BYPASS FUNCTION TO SELECTIVELY TRANSFER AN OPERATION RESULT OF A PRECEDING INSTRUCTION TO A SUCCEEDING INSTRUCTION AS A SOURCE OPERAND BEFORE WRITING THE OPERATION RESULT TO A REGISTER--.

Col. 14, line 21, after "one" insert --bypass--.

Signed and Sealed this

Eighth Day of May, 2001

*Attest:*

NICHOLAS P. GODICI

*Attesting Officer*     *Acting Director of the United States Patent and Trademark Office*